United States Patent
Head et al.

(10) Patent No.: US 9,454,754 B2
(45) Date of Patent: Sep. 27, 2016

(54) MOBILE WALLET OFF-LINE TRANSACTION SYSTEM

(71) Applicant: Barclays Bank PLC, London (GB)

(72) Inventors: Clive Head, Milton Keynes (GB); Martin Fishwick, Hartley (GB)

(73) Assignee: BARCLAYS BANK PLC, London (GB)

( * ) Notice: Subject to any disclaimer, the term of this patent is extended or adjusted under 35 U.S.C. 154(b) by 0 days.

(21) Appl. No.: 13/668,717

(22) Filed: Nov. 5, 2012

(65) Prior Publication Data

US 2013/0151405 A1  Jun. 13, 2013

(30) Foreign Application Priority Data

Dec. 6, 2011 (GB) .................................. 1120933.5
Jan. 5, 2012 (GB) .................................. 1200114.5

(51) Int. Cl.
*G06Q 20/32* (2012.01)
*G06Q 20/10* (2012.01)
*G06Q 20/36* (2012.01)
*G06Q 20/40* (2012.01)

(52) U.S. Cl.
CPC ........... *G06Q 20/105* (2013.01); *G06Q 20/32* (2013.01); *G06Q 20/322* (2013.01); *G06Q 20/36* (2013.01); *G06Q 20/4033* (2013.01)

(58) Field of Classification Search
USPC ..................................................... 705/35–45
See application file for complete search history.

(56) References Cited

U.S. PATENT DOCUMENTS

| 2002/0004760 A1* | 1/2002 | Yoshida ................. G06Q 20/04 705/26.1 |
| 2004/0181463 A1* | 9/2004 | Goldthwaite ........... G07F 17/42 705/67 |
| 2008/0052233 A1 | 2/2008 | Fisher et al. |
| 2011/0246373 A1* | 10/2011 | Prakash et al. ................. 705/75 |
| 2011/0320345 A1* | 12/2011 | Taveau ................... G06Q 20/32 705/39 |
| 2012/0123841 A1* | 5/2012 | Taveau ................... G06Q 20/10 705/14.23 |
| 2013/0138561 A1* | 5/2013 | Chan ...................... G06Q 30/04 705/41 |

FOREIGN PATENT DOCUMENTS

| EP | 2372631 | 10/2011 | |
| SG | WO 2009151401 A1 * | 12/2009 | .......... G06Q 20/387 |
| WO | WO2008075143 | 6/2008 | |

* cited by examiner

*Primary Examiner* — William Rankins

(74) *Attorney, Agent, or Firm* — Cowan, Liebowitz & Latman, P.C.; Steven D. Underwood

(57) ABSTRACT

A system for processing mobile payment transactions is described, the system includes a mobile electronic device having a mobile wallet module for initiating payment transactions from a mobile payment account associated with a payment service provider and operable to communicate with the payment service provider via a data network to settle the payment transaction. The mobile electronic device receives and stores data defining an off-line enabled merchant interface when the mobile electronic device is connected to the data network, processes an off-line payment transaction through the stored merchant interface when the mobile electronic device is not connected to the data network, and communicates details of the off-line payment transaction to the payment service provider when the mobile electronic device is re-connected to the data network.

12 Claims, 4 Drawing Sheets

MOBILE WALLET OFF-LINE TRANSACTION SYSTEM

FIELD OF THE INVENTION

This invention relates to a payment transaction processing and management system, and particularly to a system facilitating payment transactions from an electronic wallet associated with a mobile electronic device.

BACKGROUND OF THE INVENTION

Conventional mobile wallet payment transaction systems are generally known, in which mobile electronic devices such as mobile handsets, cell phones, smartphones, personal digital assistants (PDAs), personal music players, laptops, handheld computing devices, etc. are provisioned with a wallet application for processing and management of secure payment transactions with a payment service provider. However, conventional mobile wallet payment transaction systems typically require the mobile electronic device to be "on-line" and connected to the payment service provider via a data network, such as a cellular, wireless or Wi-Fi® data network, in order to request, authorize, verify, process and confirm a payment transaction. Typically, when mobile electronic devices go "off-line" and are disconnected from the data network, then the payment capability of the mobile wallet application is disabled.

What is desired is a payment transaction system that facilitates greater flexibility during a payment transaction process without requiring the mobile electronic device to be on-line and connected to a data network in order to initiate a transaction.

STATEMENTS OF THE INVENTION

According to one aspect of the present invention, there is provided a system for processing mobile payment transactions comprising a mobile electronic device configured as a mobile wallet and communicates with a payment service provider via a data network, wherein themobile electronic device enables a user to initiate a payment transaction when the mobile electronic device is "off-line" and not connected to the data network, and wherein the mobile electronic device communicates details of the payment transaction to the payment service provider when the mobile electronic device is re-connected to the data network.

In a preferred embodiment, themobile electronic device receives and stores data defining at least a portion of an off-line enabled merchant interface when the mobile electronic device is connected to the data network, processes an off-line payment transaction through the stored merchant interface when the mobile electronic device is not connected to the data network, and communicates details of the off-line payment transaction to the payment service provider when the mobile electronic device is reconnected to the data network.

The mobile electronic device automatically transmits details of all off-line purchase transactions to associated payment service providers once the mobile electronic device is reconnected to a data network.

The mobile electronic device is configured with an off-line credit limit associated with a predefined funding account. The mobile electronic device may instead or additionally be configured with an amount of stored funds that is available for an off-line payment transaction.

In another aspect, the present invention provides a method of processing mobile payment transactions by a mobile wallet module of a mobile device that is connectable a data network in an online mode, comprising computer-implemented steps of receiving and storing data defining at least a portion of a merchant interface when the mobile electronic device is in an online mode, processing an off-line payment transaction through the stored merchant interface when the mobile electronic device is not connected to the data network, and communicating details of the off-line payment transaction to a payment service provider when the mobile electronic device is reconnected to the data network.

The merchant interface may be a website for display in a browser application on the mobile electronic device.

In yet another aspect there is provided a computer program arranged to carry out the above method when executed by a programmable device.

BRIEF DESCRIPTION OF THE DRAWINGS

There now follows, by way of example only, a detailed description of embodiments of the present invention, with reference to the figures identified below.

DETAILED DESCRIPTION OF EMBODIMENTS OF THE INVENTION

First Embodiment

Figure 1:
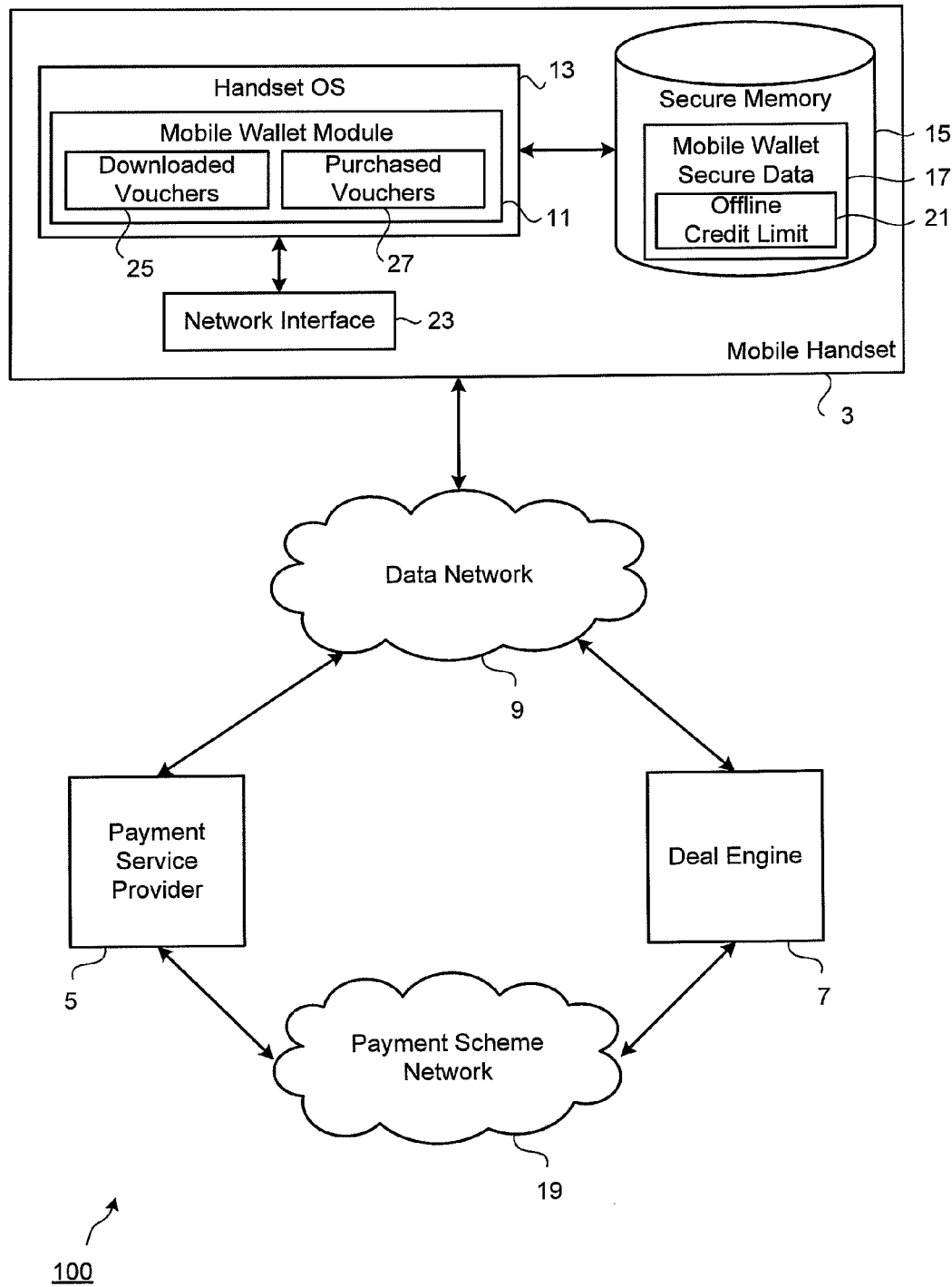
FIG. 1 is a block diagram showing the main components of a payment transaction system according to a first embodiment of the invention.

Referring to FIG. 1, there is illustrated a functional block diagram of a mobile payment transaction system 100 for implementing an "off-line" mobile payment transaction between a mobile electronic device 3, a payment service provider 5 and a deal engine 7 according to an embodiment of the present invention. In this embodiment, the mobile electronic device 3 can be any suitable mobile electronic device such as a mobile handset, cellular device, a smartphone, etc. that includes software and/or hardware components to communicate with other mobile electronic devices over a cellular network and to communicate wirelessly with the payment service provider 5 and the deal engine 7.

The deal engine 7 provides details of purchasable entities in the form of vouchers available for purchase through the user's mobile electronic device 3 to obtain a defined benefit at a merchant, and processes user access to the vouchers for pre-purchase (i.e. prior to redemption or claiming of the associated benefit). The vouchers are preferably coupons, offers, tickets, or the like and the associated benefits are preferably monetary discounts or rewards. The deal engine 7 also provides merchants with a voucher offer publishing, distribution and redemption service for free vouchers or vouchers for purchase. The deal engine 7 is preferably implemented as an on-line service of a type that is known per se, and need not be described further.

The mobile electronic device 3 communicates electronically with the payment service provider 5 and the deal engine 7 via a data network 9, to receive and pre-purchase vouchers from the deal engine 7. The data network 9 may be any suitable data communication network such as a wireless network, a local- or wide-area network including a corporate intranet or the Internet, using for example the TCP/IP protocol, or a cellular communication network such as General Packet Radio Service (GPRS), Enhanced Data rates for GSM Evolution (EDGE) or 3G ($3^{rd}$ generation mobile telecommunications technology), for example. Such communication protocols are of a type that are known by those skilled in the art of data networks and need not be described further.

The mobile electronic device 3 includes a mobile wallet module 11 that communicates with the payment service provider 5 and the deal engine 7 through a network interface 23. The mobile wallet module 11 is issued by the payment service provider 5, such as an ID card provider, credit card issuer or bank, which is responsible for authorizing and settling the payment of funds for vouchers relating to services or products purchased by the user of the mobile electronic device 3 from the deal engine 7. The mobile wallet module 11 is implemented as application software running on the handset operating system 13. The mobile wallet module 11 downloads and stores details of vouchers 25 from the deal engine 7 when the mobile electronic device 3 is on-line and connected to the data network 9. As will be described below in greater detail, the mobile wallet module 11 also stores details of vouchers 27 that have been purchased by the user, even when the mobile electronic device 3 is off-line and not connected to the data network 9.

The mobile wallet module 11 accesses a secure memory 15 of the mobile electronic device 3 storing mobile wallet secure data 17 including payment account data for one or more mobile payment accounts that have been set up on the mobile electronic device 3. The payment account data preferably includes data identifying a user's account at a payment service provider 5 from which funds can be transferred to a bank associated with the deal engine 7 to complete a transaction via a payment scheme network 19. The payment account data also includes data defining a predetermined off-line credit limit 21. The payment account data further includes a pre-authorized maximum amount of funds that the mobile wallet module 11 is allowed to use to complete purchase of vouchers or the like when the mobile electronic device 3 is off-line and not connected to the data network 9.

The payment account data can additionally include data defining an amount of pre-paid funds that are available through the mobile wallet module 11. In this way, the mobile wallet module 11 can include a payment account linked to multiple funding sources, such as a pre-paid account, deposit account and/or credit account. As an alternative, the electronic wallet module 11 can include a plurality of mobile payment accounts, each linked to a respective funding source.

The secure memory 15 maybe a Universal Integrated Circuit Card (UICC) secure element, any other secure memory configuration, such as an embedded secure element chip, or as part of a peripheral accessory device to the mobile electronic device 3, such as a micro Secure Digital card—otherwise known as a micro SD card, as are known in the art. Other forms of mobile electronic device software and/or hardware can be implemented to provide built-in secure electronic wallet functionality for accessing the secure memory 15, including encryption and decryption of the mobile wallet secure data 17, as necessary. The mobile electronic device 3 can be configured with built-in functionality providing access to the secure memory 15 on the Subscriber Identity Module (SIM) card in the mobile electronic device 3.

It will be appreciated that the mobile electronic device 3 may include additional components included in commonly known mobile electronic devices, such as a user input interface, a display, a microphone, an earpiece speaker, a camera and controller, and/or a GPS receiver etc., which are not shown.

Off-Line Payment Transaction Process

Figure 2:
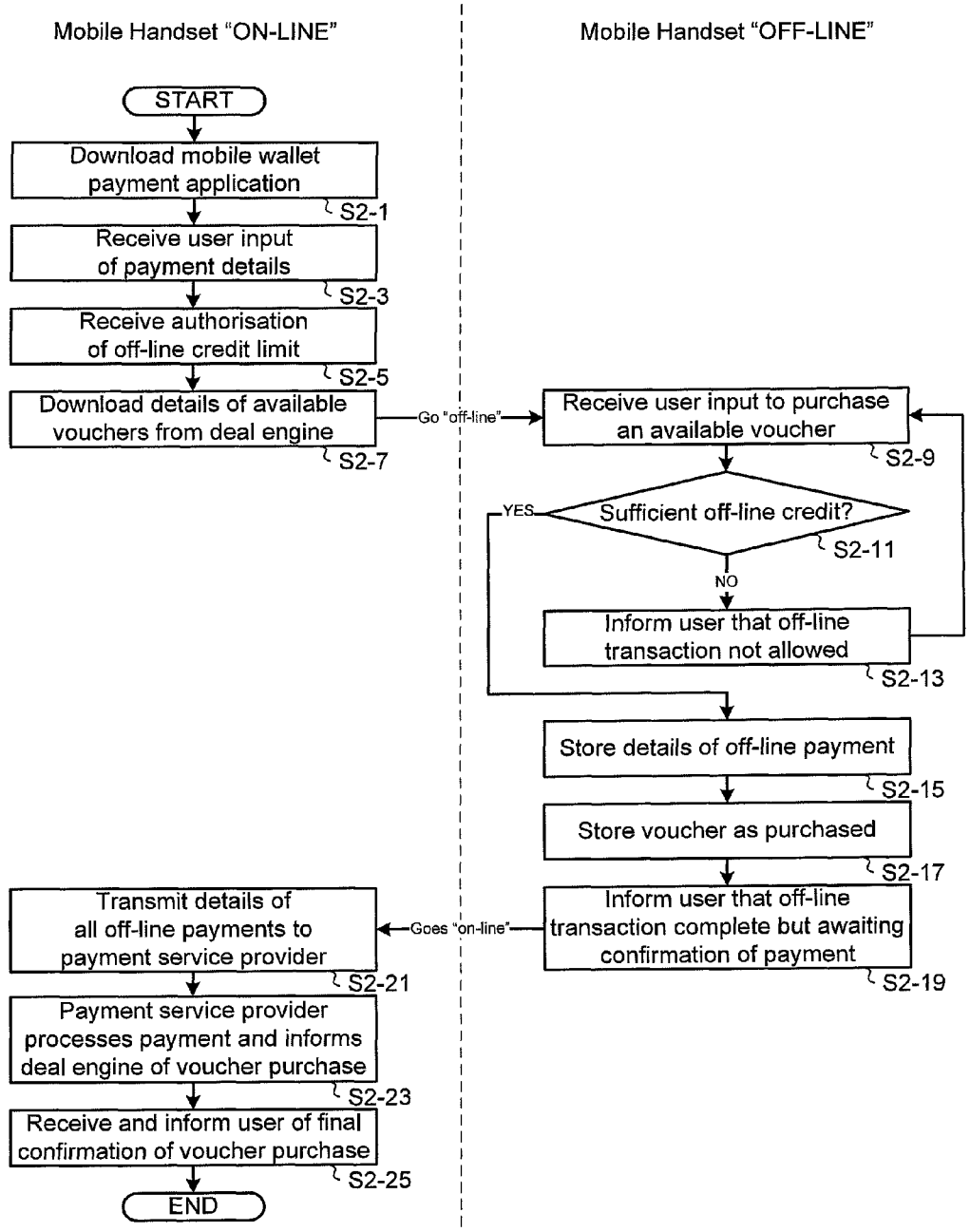
FIG. 2 is a flow diagram illustrating the main processing steps performed by the payment transaction system of FIG. 1.

Referring now to FIG. 2, there is illustrated a flow diagram describing a computer-implemented payment transaction process of the present embodiment, using the mobile electronic device 3 in intermittent communication with the payment service provider 5 via the data network 9.

The process begins at step S2-1 where the mobile electronic device 3 is on-line and connected to the data network 9 and downloads the mobile wallet module 11 that is issued by the payment service provider 5. When the user first downloads the mobile wallet module 11, the user is required to provide payment details such as a credit or debit card in order to register a mobile payment account with the payment service provider 5. Therefore, at step S2-3, the mobile electronic device 3 receives user input of the payment details and communicates with the payment service provider 5 to establish the mobile payment account. In this embodiment, the payment service provider 5 automatically pre-authorises and defines an off-line credit limit 21 for the mobile payment account. The authorized off-line credit limit is received by the mobile wallet module 11 at step S2-5 and stored in the mobile wallet secure data 17.

The credit limit can be periodically and automatically reviewed and updated without user intervention. During use, when the mobile wallet module 11 determines that the off-line credit limit has been reached or exceeded, or that the provided payment details have expired, then the user can be prompted to provide a new payment method whilst on-line.

At step S2-7, the mobile electronic device 3, in particular, the mobile wallet module 11, downloads details of available vouchers from the deal engine 7 via the data network 9. It will be appreciated that details of available vouchers for deals can be automatically downloaded by the mobile wallet module 11 when an on-line data connection is available, for example as a background task of the mobile wallet module 11, to ensure that a list of active deals is available for browsing and purchase when the mobile electronic device 3 is off-line.

This is illustrated in FIG. 2 after step S2-7, where the mobile electronic device 3 goes off-line and is disconnected from the data network 9. It will be appreciated that the mobile electronic device 3 can go off-line when it is out of range of a cellular, wireless or Wi-Fi® signal. When off-line, the mobile wallet module 11 is not able to communicate with the payment service provider 5 or the deal engine 7. However, in this embodiment, the user is able to browse and purchase downloaded vouchers 25 that are stored in the mobile wallet module 11 while the mobile electronic device 3 is off-line. Accordingly, at step S2-9, the mobile wallet module 11 receives user input to purchase one or more available downloaded vouchers 25. This can involve the user browsing a list of the downloaded vouchers 25 and selecting a desired offer that requires pre-purchase before the voucher can be presented to a merchant to claim the associated benefit. The mobile wallet module 11 can be configured to restrict the ability to buy specific types of vouchers off-line based on pre-defined rules and criteria, such as vouchers which have a maximum number available for sale.

The mobile wallet module 11 may prompt the user to confirm that payment for the voucher should be taken using the stored payment card credentials. At step S2-11, the mobile wallet module 11 determines whether the user has sufficient pre-authorised off-line credit to complete the purchase of the selected voucher. This can be determined by comparing the total purchase amount of all off-line transactions since the mobile electronic device 3 was last on-line, and checking that the total amount with the amount for the selected voucher does not exceed the pre-authorized off-line credit limit 21. Alternatively, the stored off-line credit limit 21 can be updated with each successful off-line transaction to enable a comparison of the purchase amount to the remaining available off-line credit.

When the mobile wallet module 11 determines that the purchase amount for the selected voucher exceeds the off-line credit limit 21, then at step S2-13, the user is informed that the off-line transaction is not allowed and processing returns to step S2-9 where the user can select another offer to purchase while the mobile electronic device 3 remains off-line. On the other hand, when the mobile wallet module 11 determines that there is sufficient off-line credit to complete the transaction, then at step S2-15, details of the off-line payment for the selected voucher are stored in the mobile wallet secure data 17. The off-line payment details can include data identifying the payer account and the payee account, and a unique voucher identifier and the quantity purchased. The purchase payment details are stored within the secure memory 15. The purchased voucher 27 is stored by the mobile wallet module 11 at step S2-17. It will be appreciated that the downloaded and purchased vouchers can be stored together and distinguishable by associated data identifying the purchase state of the voucher.

Once off-line payment details have been stored for the purchased voucher 27, then at step S2-19, the mobile wallet module 11 outputs an initial confirmation to inform the user that the off-line transaction is complete but is awaiting confirmation of actual transfer of funds from the payment service provider 5 to the deal engine 7 or its associated payment service provider. It will be appreciated that at this stage, the off-line purchase of a downloaded voucher has been completed by the mobile wallet module 11 and the user is able to select another voucher to purchase while the mobile electronic device 3 remains off-line, as described in steps S2-9 to S2-19 above.

When the mobile electronic device 3 is reconnected to the data network 9 and goes on-line, then at step S2-21, the mobile wallet module 11 retrieves the details of all off-line payments that have been stored in the secure memory 15 while the mobile electronic device 3 was off-line. It will be appreciated that the mobile handset operating system 13 typically monitors for and determines when a data network 9 is available and handles re-connection to the data network 9. Once the mobile electronic device 3 is connected and on-line, the retrieved off-line payment details are transmitted by the mobile wallet module 11 to the payment service provider 5 associated with the pre-authorized off-line credit. At step S2-23, the payment service provider 5 processes the received payment details to affect the actual transfer of funds for the purchased vouchers to the payment service provider associated with the deal engine 7. The payment service provider 5 then transmits details of the vouchers that were purchased off-line to the deal engine 7 and transmits a message with data indicating final confirmation of the voucher purchases to the mobile electronic device 3. At step S2-25, the mobile wallet module 11 receives the message from the payment service provider 5 and outputs final confirmation of the purchased vouchers to the user.

In the embodiment described above, the mobile wallet module is arranged to download vouchers from a deal engine, and the downloaded vouchers can be purchased by a user when the mobile handset is off-line. It will be appreciated that the off-line purchase processing by the mobile wallet module can be adapted to enable users to perform off-line remote payments for any other form of purchasable entity that is stored on the mobile handset.

Advantages

A number of advantages will be understood from the above description of the first embodiment of the present invention.

In particular, the embodiment enables customers of a web site such as a daily deal site to pre-purchase offers and pre-paid vouchers in a mobile wallet application of a mobile electronic device, without the need for the mobile electronic device to be on-line at the time of the transaction. The purchase of a pre-paid voucher can be completed within the mobile application without the need to have a real-time data connection to the payment service provider. This advantageously enables customers to never miss out on an offer due to lack of data network connectivity, particularly when a voucher or offer is time sensitive with an impending time limit or purchase deadline.

Additionally, details of available vouchers for deals are automatically downloaded in the background to the mobile wallet application when an on-line data connection is available to ensure that a list of active deals is available when the mobile electronic device is off-line. The details of the voucher payment are automatically passed to the payment service provider and details of the purchased voucher are passed to the deal site or provider when the mobile handset is next on-line.

Second Embodiment

Figure 3:
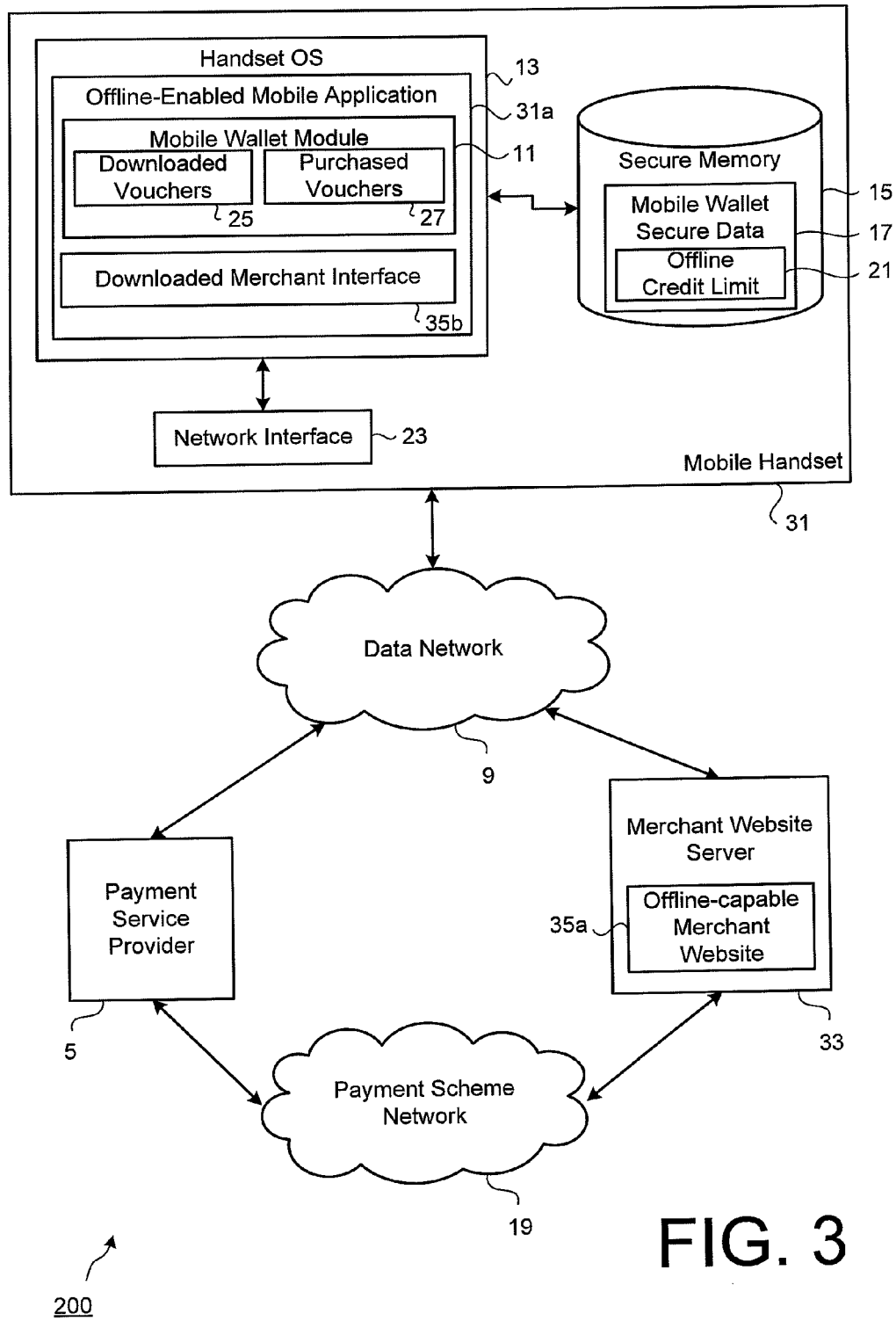
FIG. 3 is a block diagram showing the main components of a payment transaction system according to a second embodiment of the invention.

FIG. 3 is a functional block diagram of a mobile payment transaction system 200 for implementing an "off-line" mobile payment transaction between a mobile electronic device 31, a payment service provider 5 and a merchant web server 33 according to a second embodiment of the present invention. Corresponding reference numerals to those numerals of preceding figures are used, where appropriate, for corresponding elements.

In this second embodiment, the mobile electronic device 31 is configured to download, while the mobile electronic device 31 is on-line and connected to a merchant's web server 33, data defining an off-line capable merchant interface 35a that is configured for off-line purchasing. The downloaded off-line capable merchant interface 35b can be a pre-loaded merchant website for display in a web browser application on a mobile electronic device, or data defining one or more interface screens for display in a mobile application associated with the merchant. The off-line capable merchant interface 35b includes off-line payment functionality to enable purchases to be completed by the mobile electronic device 31 when off-line, in a similar manner as described above in the first embodiment.

For example, the downloaded off-line capable merchant interface 35b includes data defining one or more interface screens that enable a user to initiate and complete a purchase while the mobile electronic device 31 is off-line. The off-line purchase includes user input selection of items, products and/or services to be purchased while the mobile electronic device 31 is off-line, input of customer details such as postal address and off-line payment details, and requesting and confirming off-line payment for the purchased entities.

Merchant interfaces 35a that have been enabled and configured to support off-line purchases are downloaded and stored as downloaded off-line capable merchant interfaces 35b by an off-line enabled mobile application 31a running on the mobile electronic device 31. The downloaded off-line capable merchant interface 35b is configured to be downloaded either as an off-line copy of the full website or merchant online shop interface, or as an off-line specific portion or subset of the full website or online shop interface. It will be appreciated that the following elements of the merchant sites must be included in the downloaded off-line capable merchant interface 35b: the items, products, services etc. that can be purchased off-line, the purchase and/or payment screen(s), and the merchant's details for allocation of payments.

In a similar manner, as described in the above embodiment, purchases made via the merchant's online interface while off-line are stored as purchased vouchers 27 in the mobile wallet module 11 of the mobile electronic device 31. When the mobile electronic device 31 is next on-line, the stored off-line purchases 27 are passed back to the merchant's web server 33 and the payment service provider 5 to complete the off-line purchase transactions.

Downloaded off-line capable merchant interfaces 35b are periodically refreshed and updated when the mobile electronic device 31 is on-line. If the mobile electronic device 31 has been off-line for an extended period of time, then remote off-line purchasing can be disabled to avoid customers completing purchases for entities that are no longer available or have been re-priced. After pre-loading the off-line capable merchant interface 35b, a customer is therefore able to initiate a purchase through the pre-loaded off-line capable merchant interface 35b even when the mobile electronic device 31 is off-line. The customer is also able to complete a purchase if the connection to the data network is lost. On completion of an off-line purchase through the pre-loaded off-line capable merchant interface 35b, details of the off-line payment are stored by the mobile electronic device 31 and transmitted to the payment service provider 5 when the mobile electronic device 31 is reconnected to the data network, as in the first embodiment described above.

Third Embodiment

Figure 4:
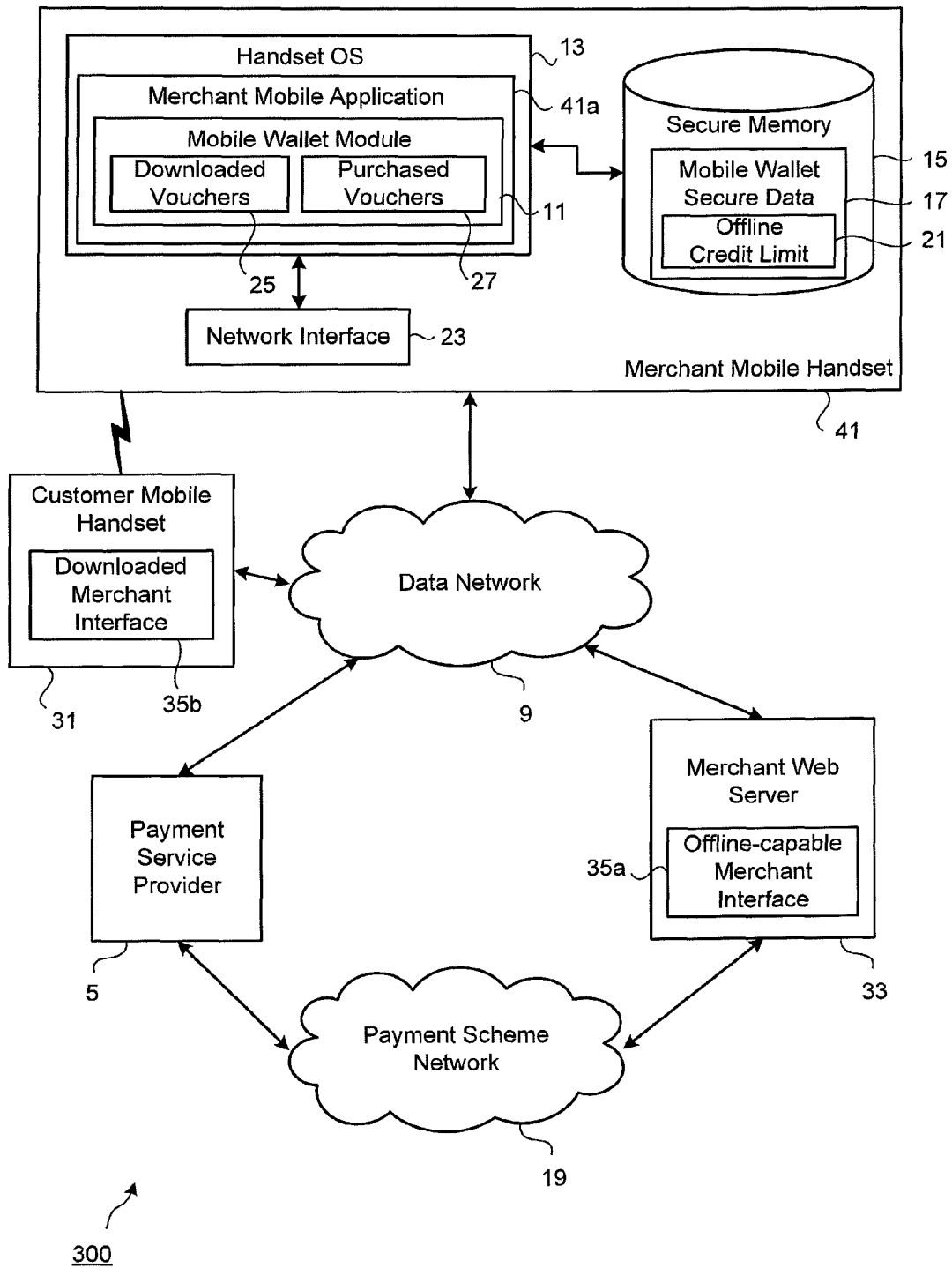
FIG. 4 is a block diagram showing the main components of a payment transaction system according to a third embodiment of the invention.

FIG. 4 is a functional block diagram of a mobile payment transaction system 300 for implementing an "off-line" mobile payment transaction between a customer mobile electronic device 31, a merchant mobile electronic device 41, a payment service provider 5 and a merchant web server 33 according to a third embodiment of the present invention. Corresponding reference numerals to those numerals of preceding figures are again used where appropriate for corresponding elements.

In this third embodiment, the customer mobile electronic device 31 is configured to work with a merchant mobile application 41a that has the embedded capability to interact directly with a mobile wallet module 11. It will be appreciated that the customer mobile electronic device 31 communicates directly with the merchant mobile electronic device 41 over any known form of data connection, while the mobile electronic devices 31, 41 are both off-line and not connected to the merchant web server 33 or the payment service provider 5. The merchant mobile application 41a in this third embodiment is configured to support off-line payment transactions by storing and making available, to a customer and/or a customer mobile electronic device 31, the following information, when one or both of the customer and merchant mobile electronic devices 31 and 41 are off-line: items, products, services etc. that can be purchased off-line, customer details (delivery address etc.) and merchants details (for receipt of payment). The merchant mobile application 41a utilizes the same off-line payment transaction process as described in the first embodiment such as maintaining the off-line data (customers off-line credit limit, items for purchase); storing successful off-line payment transactions and passing all off-line payment transactions to the payment service provider 5 when back on-line. In a similar manner as described above with reference to the first embodiment, purchases made via the merchant's mobile application while off-line can be stored as purchased vouchers 27. When the merchant mobile electronic device 41 is next on-line, the stored off-line purchases are passed back to the merchant's web server 33 and the payment service provider 5 to complete the off-line purchase transactions. If the merchant mobile electronic device 41 has been off-line for an extended period of time, then remote off-line purchasing can be disabled to avoid customers completing purchases for entities that are no longer available or have been re-priced.

Fourth Embodiment

As a fourth embodiment, the customer mobile electronic device 31 can be configured to provide off-line payment transaction processing to merchant mobile applications 41a on merchant mobile electronic devices 41 that are not configured with the embedded mobile wallet module 11 capability as described in the third embodiment above. Instead, and in accordance with this fourth embodiment, the capability is provided by enabling a merchant's mobile application 41a to securely access the off-line payment transaction process in an off-line enabled mobile application 31a as described above with reference to the second embodiment. The merchant mobile application 41a passes the transaction details to the off-line enabled mobile application 31a which will then process the transaction as described in the first embodiment.

The merchant mobile application 41a passes the following pieces of information to the off-line enabled mobile application 31a on the customer mobile electronic device 31: the items, products and/or services that the customer wants to purchase; the customer details (delivery address etc.) and merchants details (for receipt of payment). Purchases made via the merchant's application while off-line are preferably stored as purchased vouchers 27 in the off-line enabled mobile application 31a. As described in the above embodiments, when the mobile electronic device 31 is next on-line, the stored off-line purchases 27 are passed back to the merchant web server 33 and the payment service provider 5 to complete the off-line purchase transactions.

As described in the embodiments above, if the mobile electronic device 31 has been off-line for an extended period of time, then remote off-line purchasing can be disabled to avoid customers completing purchases for entities that are no longer available or have been re-priced.

ALTERNATIVE EMBODIMENTS

It will be understood that embodiments of the present invention are described herein by way of example only, and that various changes and modifications may be made without departing from the scope of the invention.

For example, in the embodiments described above, a mobile payment transaction system is described for implementing an "off-line" mobile payment transaction between a mobile handset, a payment service provider and a merchant web server. As those skilled in the art will appreciate, in alternative embodiments, the mobile handset can instead or additionally be any suitable mobile electronic device that includes software and/or hardware components to communicate wirelessly with the payment service provider and merchant web server, such as, but not limited to, a handheld computing device, a portable digital assistant, a portable media player, a gaming device, a pocket PC, etc.

In the embodiments described above, the mobile handset store s the mobile wallet module (also referred to as an application, computer program or software) in memory, which when executed, enables the mobile handset to implement embodiments of the present invention as discussed herein. As those skilled in the art will appreciate, the software may be stored in a computer program product and loaded into the mobile handset using any known instrument, such as removable storage disk or drive, hard disk drive, or communication interface, to provide some examples.

Further alternative embodiments may be envisaged, which nevertheless fall within the scope of the following claims.

What is claimed is:

1. A system comprising:
   a payment service provider configured to settle a payment transaction from a payment account; and
   a mobile electronic device comprising a mobile wallet application configured to communicate with payment service provider over a data network when the mobile electronic device is connected to the data network,
   wherein the mobile wallet application stores data defining an off-line credit limit associated with the payment account, and wherein the mobile wallet application is configured to:
   download data defining one or more purchasable vouchers from a remote database when the mobile electronic device is connected to the data network;
   provide a user interface for the user to view the downloaded purchasable vouchers, wherein the interface is available when the mobile electronic device is not connected to the data network;
   receive, via the user interface, user input to select and purchase at least one of the downloaded vouchers when the mobile electronic device is not connected to the data network, and in response:
   determine that the mobile electronic device is not connected to the data network;
   check that a purchase amount of the at least one selected downloaded vouchers does not exceed the off-line credit limit;
   store the at least one selected downloaded vouchers as purchased vouchers after the off-line credit limit check and before the mobile device is re-connected to the data network, to complete an off-line payment transaction for the purchased vouchers; and
   determine that the mobile electronic device is re-connected to the data network and in response, communicate details of the off-line payment transaction to the payment service provider.

2. The system of claim 1, wherein the payment service provider settles the off-line payment transaction in response to receipt of the details and communicates confirmation of a settled transaction to the mobile wallet application.

3. The system of claim 1, wherein the mobile wallet application receives user input to initiate a plurality of off-line payment transactions and to automatically transmit details of the plurality of off-line payment transaction to associated payment service providers when the mobile wallet application is reconnected to a data network.

4. The system of claim 1, wherein the mobile electronic device stores data identifying a plurality of mobile payment accounts associated with the mobile wallet application.

5. A method comprising:
   storing, by a mobile wallet application on a mobile electronic device, data defining an offline credit limit associated with a payment account provided by a payment service provider, wherein the mobile wallet application is configured to communicate with the payment service provider over a data network when the mobile electronic device is connected to the data network;
   downloading over said data network from a remote database data defining one or more purchasable vouchers when the mobile electronic device is connected to the data network;
   providing a user interface for the user to view the downloaded purchasable vouchers, wherein the interface is available when the mobile electronic device is not connected to the data network;
   receiving, via the user interface, user input to select and purchase at least one of the downloaded vouchers when the mobile electronic device is not connected to the data network, and in response and in response:
   determining that the mobile electronic device is not connected to the data network;
   checking that a purchase amount of the at least one selected downloaded vouchers does not exceed the off-line credit limit;
   storing the at least one downloaded vouchers as purchased vouchers after the off-line credit limit check and before the mobile device is re-connected to the data network, to complete an off-line payment transaction for the purchased vouchers; and
   determining that the mobile electronic device is re-connected to the data network and in response, communicating details of the off-line payment transaction to the payment service provider.

6. A mobile device comprising:
   a memory storing a mobile wallet application configured to communicate with a payment service provider over a data network when the mobile electronic device is connected to the data network;
   wherein the mobile wallet application stores data defining an off-line credit limit associated with a payment account provided by the payment service provider, and wherein the mobile wallet application is configured to:
   download data defining one or more purchasable vouchers from a remote database when the mobile device is connected to the data network;
   provide a user interface for the user to view the downloaded purchasable vouchers, wherein the interface is available when the mobile electronic device is not connected to the data network;
   receive, via the user interface, user input to select and purchase at least one of the downloaded vouchers when the mobile device is not connected to the data network, and in response:

determine that the mobile electronic device is not connected to the data network;

check that a purchase amount of the at least one selected downloaded vouchers does not exceed the off-line credit limit; and to store the at least one selected downloaded vouchers as purchased vouchers after the off-line credit limit check and before the mobile device is re-connected to the data network, to complete an off-line payment transaction for the purchased vouchers; and determine that the mobile electronic device is re-connected to the data network and in response, communicate details of the off-line payment transaction to the payment service provider.

7. The device of claim 6, wherein a payment service provider is operable to settle the off-line payment transaction in response to receipt of the details and to communicate confirmation of the settled transaction to the mobile device.

8. The device of claim 6, wherein the mobile device is operable to receive user input to initiate a plurality of off-line payment transactions and to automatically transmit details of all off-line payment transactions to associated payment service providers when the mobile device is re-connected to a data network.

9. The device of claim 6, wherein the mobile device stores data identifying a plurality of mobile payment accounts associated with a mobile wallet application.

10. The device of claim 6, wherein the mobile device comprises a secure memory for storing data associated with a mobile wallet application.

11. The device of claim 6, wherein a payment service provider settles the off-line payment transaction in response to receiving the off-line payment transaction details and communicating confirmation of the settled transaction to the mobile device.

12. The device of claim 6, further comprising a mobile handset that receives user input to initiate a plurality of off-line payment transactions and automatically transmits details of all off-line payment transactions to associated payment service providers when the mobile device is re-connected to a data network.

* * * * *